Nov. 25, 1969   E. NEUENSCHWANDER   3,480,426
PRODUCTION OF PARTICULATE, NON-PYROPHORIC METALS
Filed June 7, 1966
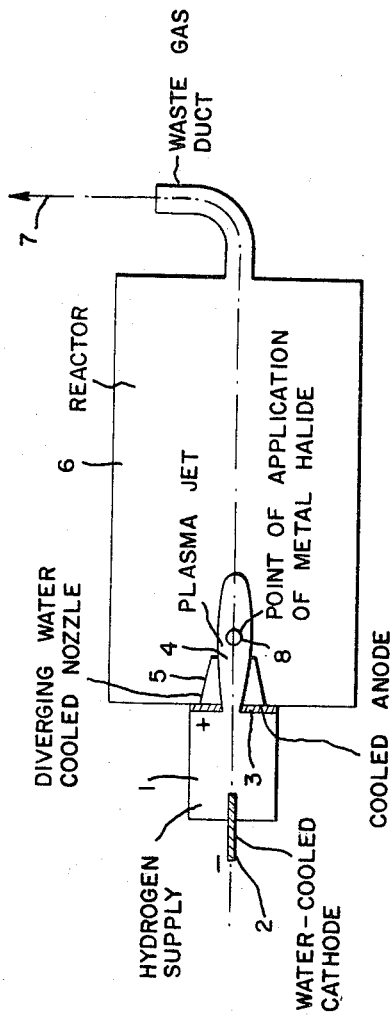
INVENTOR
ERNST NEUENSCHWANDER
BY Harry Goldsmith
ATTORNEY

United States Patent Office 3,480,426
Patented Nov. 25, 1969

3,480,426
PRODUCTION OF PARTICULATE, NON-PYROPHORIC METALS
Ernst Neuenschwander, Basel, Switzerland, assignor, by mesne assignments, to Hermann C. Starck Berlin, Berlin, Germany
Filed June 7, 1966, Ser. No. 555,904
Claims priority, application Switzerland, June 25, 1965, 8,950/65
Int. Cl. C22b 5/14; B22f 9/00; C22d 5/00
U.S. Cl. 75—.5
3 Claims

ABSTRACT OF THE DISCLOSURE

A process is provided for manufacturing non-pyrophoric, ultrafine powders of metals of the Groups IV*b*, V*b*, VI*b* or of the actinium series of the periodic chart in which a halide of the desired metal is reduced in a hydrogen plasma containing 5 to 10 molecular proportions of hydrogen for each molecular proportion of the metal halide. The ultrafine metal powders of this invention are especially useful for preparing sintered metal articles such a capacitors.

---

In gas-discharge physics the term plasma is used with reference to partially or wholly ionized gas. If the plasma as a whole has a directional velocity, it is called a plasma flow or plasma jet. Such a plasma jet can be produced, for example, by blowing a gas through an electric arc. In this manner temperatures of 20,000° C. and even higher can be attained. The velocity may range from a few meters per second to a multiple of the speed of sound.

It is known that chemical reactions may be carried out in a plasma jet. In this way thermal decompositions, reductions with carbon or hydrogen, and halogenations have been performed; furthermore, a variety of nitrogen compounds has been prepared (see inter alia "The Plasma Jet," Scientific American 197 [1957], No. 2, pp. 80 et seq. and "Industrial and Engineering Chemistry," vol. 55 [1963], pp. 16 et seq.).

It is further known that the gas stream may consist of an inert gas or of a reactive gas. For example, when argon is used a plasma jet is obtained which serves only as a source of heat; when on the other hand nitrogen or oxygen is used, the resulting gas is not only very hot but can, under suitable conditions, also be used for chemical reactions. When a graphite anode is used, reactions with carbon may be carried out in the plasma jet.

The present invention provides a process for the manufacture of finely dispersed, non-pyrophoric metals of the Groups IV*b*, V*b*, VI*b* or of the actinium series of the Periodic Table wherein a halide of one of the said metals is treated with a hydrogen plasma, using for every molecular proportion of metal halide only 5 to 10 molecular proportions of hydrogen.

As metals of the groups mentioned above, designated as defined in the Handbook of Chemistry and Physics of Ch.D. Hodgeman, 1960, page 444, there are suitable titanium, zirconium, hafnium, vanadium, niobium, tantalum, molybdenum, tungsten, uranium and thorium.

It is advantageous to use as metal halides those which are easiest to volatilize without decomposing. As a rule, this is true of the most highly halogenated metal halides. Preferred use is made of the chlorides, especially of $TiCl_4$, $ZrCl_4$, $HfCl_4$, $VCl_4$, $NbCl_5$, $TaCl_5$, $MoCl_5$, $WCl_5$, $WCl_6$, $ThCl_4$ and $UCl_4$. Instead of the molybdenum and tungsten chlorides there may be used with equally good results the oxychlorides $MoOCl_4$ and $WOCl_4$ respectively.

In the case of a metal chloride the following reaction equations (wherein Me is a symbol representing the metal) apply:

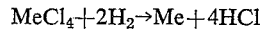

or

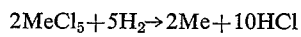

or

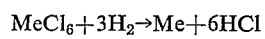

In the case of an oxychloride the following reaction equation applies:

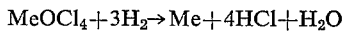

Depending on its degree of dissociation, hydrogen enters into the reaction partially in its atomic state.

Normally, the reaction in the plasma flame gives rise to metal in the pyrophoric form but, as has been observed, this is not the case when the reaction is performed with a realtively minor hydrogen excess, that is to say at a sufficiently high concentration of metal chloride in the plasma flame, because in this way metals of a less finely dispersed form are obtained. When the refractory metals of Groups IV*b*, V*b*, and VI*b* and of the actinium series are used at the ratio specified for the present process of 5 to 10 mols of hydrogen for every mol of metal chloride, the average particle size of the resulting metal ranges from 0.03 to 0.1µ. In this context the term "average particle size" is meant to indicate the so-called half-value particle size which is defined to indicate that 50% of the particles of the whole collective are below this size. In view of the general experience it must be said that it is surprising that metals of the indicated range of particle sizes are non-pyrophoric. Using the definition in "Staub" 22 [1962] in page 495, the term pyrophoricity is here used to describe the spontaneous ignition occurring in the absence of an extraneous igniter of a small quantity of a powder in the solid state on contact with air at room temperature. The non-pyrophoric character is also attributable to the shape of the particles. As has been revealed by electron microscopic examinations, the present process furnishes predominantly particles having approximately the shape of cubes, octaheders or spheres. Thus, at the high reaction temperature, which is above the melting point of the metal formed, the resulting particles are not strongly fissured or pourous, as is the case when the reaction is carried out at a low temperature. Accordingly, taking into consideration its particle size the metal powder has a minimal surface and this has been verified by the surface areas measured and computed from grain size distribution graphs. In addition, it is known that the pyrophoric character of a substance also depends on fault arrangements of the lattice which constitute an increased energy state. The high reaction temperature used in the process of this invention is extremely favorable in this respect too because such lattice faults can heal much more quickly than at a low temperature.

Another object of this invention is metal powders obtained by the present process. They are characterized by average particle size from 0.03 to 0.1µ, by a form factor F of 1.0 to 1.5 and an oxygen content not exceeding 3 mg./square meter of surface. The definition of the average particle size has been given above. The form factor is defined as the ratio between the true surface of the particles (in actual practice measured according to a certain method) and the surface calculated from an assumed spherical shape of the particles; see W. Batel "Korngroessenmesstechnik," Editors Springer, 1960, page 14. The form factor was in the present case determined as follows: Some 1000 particles were measured and counted on electron microphotographs to enable the particle size distribution graph to be plotted as a first step. As the characteristic length of a particle the diameter of a circle whose projection had the identical area was chosen. Using as a basis, spheres having these diameters, the surface of the particle collective can then be calculated from the distribution graph. The form factor as defined above is then obtained from this value and from the value resulting from the BET-measurement.

The use of metals having an average particle size below 1μ is of special importance to powder-metallurgical processes, either as matrix metal in dispersion consolidation, or for the manufacture of alloys whose constituents have widely different melting points, or for sintering operations at lower temperatures. Fine refractory metals are also of importance to the reactor technique and to the catalysis.

The non-pyrophoric character of the metals obtained is very advantageous to their handling and further processing.

The present process is also distinguished by high yields which, as a rule, are better than 90%.

In a further stage of the present process the resulting, very finely pulverulent and very voluminous metal is subjected to an after-treatment to reduce its volume and to free it from contaminants (adsorbed hydrochloric acid and low-valency halides). In this after-treatment the powder is first rotated for several hours, whereby its bulk volume is reduced to one-fifth and then under a vacuum from $10^{-1}$ to $10^{-4}$ mm. Hg pressure calcined at a temperature at which the particles do not yet grow, preferably at a temperature from 600 to 800° C.; if desired, the after-treatment may be performed first in the presence of hydrogen and then under a vacuum. Unexpectedly, such an after-treatment still leaves the powder non-pyrophoric. Oxidation in air proceeds only slowly and this is another feature facilitating the handling of the fine material.

The present process is generally performed by heating the metal halide to a temperature at which the vapor pressure of the halide is from ½ to 1 atmosphere, and if desired a carrier gas (argon or hydrogen) is conveyed over the surface of the halide. The resulting gas mixture is then injected into the plasma jet.

Depending on the conditions chosen the reaction time in the plasma jet is from $10^{-2}$ to $10^{-4}$ seconds and the temperature in it ranges from 2000° to 5000° C.

The plasma jet is produced with the aid of a high-ampere electric arc in a so-called plasma generator which is advantageously of the known design and comprises a water-cooled hollow copper anode and a cooled tungsten cathode. To facilitate the mixing of the above-mentioned, relatively large amount of halides with the hydrogen plasma jet, the jet is widened in a diverging nozzle following upon the burner. Then only is the hydrogen jet combined with the chloride jet. By widening the plasma jet, good mixing with the metal halide and, as a result, a complete reaction are achieved within the short time of residence. By letting the mixing of the reactants take place well away from any wall of the apparatus, any agglomerations of the metal formed on the apparatus and above all on the burner can be counteracted. Such agglomerations would rapidly clog the burner, especially when high concentrations are used, so that the process could not be performed continuously. It is another advantage of this performance of the reaction that the large quantities of material reacted inside the flame do not impair the stability of the electric arc.

FIGURE 1 of the accompanying drawing is a diagrammatic representation of a plasma jet generator in side elevation, where 1 is the supply of hydrogen which, as a rule, flows in at right angles to the axis of the plasma jet at a rate which can be varied within wide limits; 2 is the water-cooled cathode which is advantageously made variable for its position; 3 is the cooled anode; 4 represents the plasma jet produced; 5 is the diverging, water-cooled nozzle; 6 is the reactor and 7 the waste gas duct which is taken through settling vessels to remove as much dust as possible; 8 is the point where the metal halide is supplied.

The metal halide is advantageously injected into the plasma jet through a supply tube made from quartz. As a rule, the metal is formed in the plasma jet under atmospheric pressure, but if desired a vacuum may be used. The points at which the metal halide is injected into the plasma jet must be determined in each case by suitable preliminary experiments.

EXAMPLE

Manufacture of finely dispersed niobium

The plasma generator was operated under the following conditions:

Current intensity _____amperes__ 200
Arc voltage _____volts__ 120
$H_2$ throughout per minute (at 0° C. under 760 mm.
  Hg pressure) _____standard liters__ 74

At the exit opening of the diverging nozzle the plasma jet has a mean velocity of about 180 m./second and an average temperature of about 3200° C. At 1 cm. past the exit opening of the diverging nozzle 100 g. of gaseous $NbCl_5$ (with argon as carrier gas) per minute are fed into the hydrogen jet. The reaction mixture forms a brilliant jet of about 15 cm. length.

Per minute 32 g. of niobium, corresponding to a yield of 93%, are obtained.

500 grams each of the voluminous niobium powder accumulating in the reactor are densified by being rotated at 9000 revolutions per hour for 10 hours on rollers. The material is then calcined for 6 hours in a weak current of $H_2$ (10 liters per hour) and then for another 4 hours under vacuum at 800° C. and thereupon cooled.

The resulting, non-pyrophoric niobium contains 1.4% of oxygen. On exposure to air it undergoes oxidation and its weight increases slowly, but no spontaneous ignition occurs.

The specific surface measured by the BET method was found to be 6.5 m.²/gram. The particle size distribution was determined by counting about 1000 particles on electron micrographs with the use of a semi-automatic instrument. The following distribution was found:

5% below 0.009μ
25% below 0.018μ
50% below 0.03μ
75% below 0.05μ
95% below 0.10μ that is to say the half-value particle size was 0.03μ.

The form factor F, calculated as described above, was 1.1.

Tantalum, molybdenum, tungsten, zirconium and hafnium were produced in a similar way. The results of these experiments are shown in the following table:

| Metal | Reaction conditions | Throughput per minute | Yield, percent | Calcin. temp., °C. | Oxygen, Percent | Spec. surface, m.²/g. | Particle size (share in μ) | | | | | Form factor F |
|---|---|---|---|---|---|---|---|---|---|---|---|---|
| | | | | | | | 5% < | 25% < | 50% < | 75% < | 95% < | |
| TA | A | 120 g. TaCl₅ | 96 | 800 | 0.8 | 2.8 | 0.020 | 0.04 | 0.06 | 0.10 | 0.16 | 1.4 |
| Mo | A | 100 g. MoCl₅ | 90 | 700 | 0.6 | 9.6 | 0.018 | 0.03 | 0.04 | 0.06 | 0.09 | 1.2 |
| W | A | 150 g. WCl₆ | 94 | 700 | 0.7 | 6.1 | 0.012 | 0.02 | 0.03 | 0.04 | 0.07 | 1.3 |
| Zr | B | 30 g. ZrCl₄ | 65 | 800 | 1.8 | 13.0 | 0.009 | 0.018 | 0.03 | 0.045 | 0.09 | 1.4 |
| Hf | B | 35 g. HfCl₄ | 70 | 800 | 1.3 | 6.5 | 0.009 | 0.018 | 0.03 | 0.045 | 0.09 | 1.4 |

Reaction conditions: A=200 amperes, 120 volts, 74 standard litres of $H_2$ per minute. B=115 amperes, 98 volts, 24 standard litres of $H_2$ per minute.

What is claimed is:

1. Process for the production of ultrafine, non-pyrophoric metal powders having particles predominantly in the shape of cubes, octaheders or spheres and an average particle size of about 0.03 to 0.1μ, of a metal selected from the group consisting of the members of Groups IVb, Vb, and VIb and the members of the actinium series of the Periodic Table, said process comprising reducing a halide of the metal in a hydrogen plasma, using for every molecular proportion of the metal halide only 5 to 10 molecular proportions of hydrogen.

2. Process according to claim 1, wherein a chloride of the metal is used as the metal halide.

3. Process according to claim 1, wherein the metal halide is selected from the group consisting of tantalum pentachloride, niobium pentachloride, tungsten hexachloride, molybdenum pentachloride, zirconium tetrachloride and hafnium tetrachloride.

References Cited

UNITED STATES PATENTS

| | | | |
|---|---|---|---|
| 3,211,548 | 10/1965 | Scheller et al. | 75—84 |
| 3,062,638 | 11/1962 | Culbertson et al. | 75—.5 |
| 3,070,420 | 12/1962 | White et al. | 264—.5 |
| 3,290,723 | 12/1966 | Jaques et al. | 264—15 |

L. DEWAYNE RUTLEDGE, Primary Examiner

W. W. STALLARD, Assistant Examiner

U.S. Cl. X.R.

75—10, 84